March 24, 1931.         C. W. PETERSON         1,797,965
LOUD SPEAKER DRIVING MOTOR Filed March 1, 1929

Charles W. Peterson,
INVENTOR.

Patented Mar. 24, 1931

1,797,965

UNITED STATES PATENT OFFICE

CHARLES W. PETERSON, OF CINCINNATI, OHIO

LOUD-SPEAKER-DRIVING MOTOR

Application filed March 1, 1929. Serial No. 343,735.

This invention relates to driving motors for loud speakers. The object of my invention is to provide a driving motor which while small in size is very efficient in converting electrical sound energy into mechanical energy of vibration, a motor in which the natural period of vibration of the armature system is too low to cause noticeable distortion in the sound output of the speaker thru the ordinary range of musical frequencies, a motor having a long armature travel without moving wires and a motor having magnetic paths of large area permitting great power output without magnetic saturation.

Figure 1:
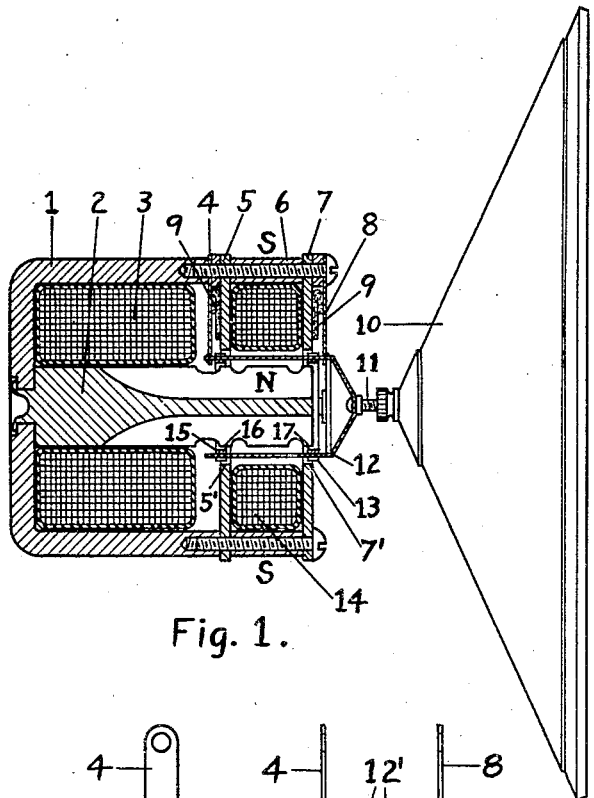
Figure 2:
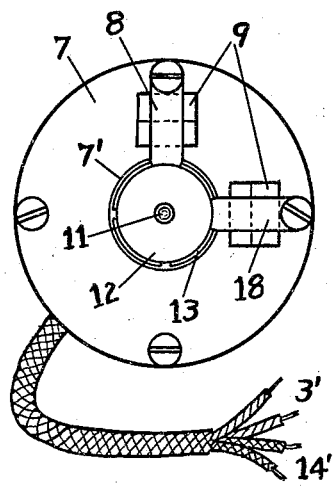
Figures 3, 4:
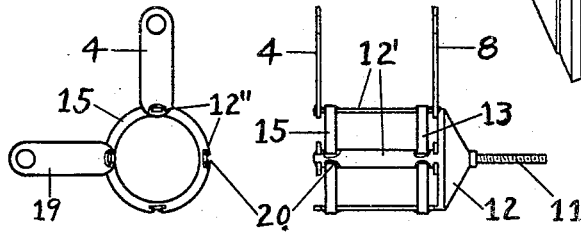
Figures 5, 6:
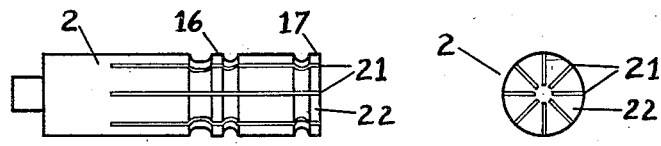

This driving motor may be clearly understood by reference to the attached drawings, in which, Fig. 1 is a longitudinal sectional view thru the center of the motor, Fig. 2 is a front end view of the motor with the diaphragm removed, Fig. 3 is an end view of the armature assembly from the rear, Fig. 4 is a side view of the armature assembly, Fig. 5 is a side view of the core and Fig. 6 is an end view of the core from the front.

In Fig. 1, 1 is a cup of paramagnetic material, 2 is a core of paramagnetic material fastened to the cup at one end and having poles 16 and 17 near the other end. 3 is a field coil, 5 and 7 are thin ring, or washer, poles of paramagnetic material spaced by spacer ring, or yoke, 6 also of paramagnetic material, and are mounted concentric with core 2 forming one air gap between the edge of the hole 5' of washer 5 and pole 16 of core 2, and a second air gap between edge of hole 7' of washer 7 and pole 17 of core 2. 10 is a sound generating diaphragm, 11 is a screw connecting diaphragm 10 to armature spider 12, 13 and 15 are armature rings of paramagnetic material which are held by spider 12 in a spaced relation equal to the length of spacer 6 plus the thickness of ring 5 or 7, and are held flexibly concentric with holes 5' and 7' and core 2 by armature guide springs 4, 8 and 18 shown in Fig. 2 and 19 shown in Fig. 3. The holes in the center of armature rings 13 and 15 are slightly larger in diameter than the diameter of poles 17 and 16 of core 2, and the outside diameter of the armature rings is slightly less than the diameter of the holes 7' and 5' of washers 7 and 5, and the springs 4, 8, 18 Fig. 2 and 19 Fig. 3 let the armature assembly 12 and diaphragm 10 move freely in and out a considerable distance without the armature rings touching either the core poles or the washer poles. 9 are pads of soft aperiodic material, such as felt, and serve to dampen out any natural period of vibration which springs 4, 8, 18 Fig. 2 and 19 Fig. 3 may have, and also act as a sort of cushion to keep these springs from hitting metal in case armature assembly 12 is moved too far. 14 is an armature coil around the portion of core 2 between washer poles 5 and 7.

Fig. 2 which is a front end view of the motor with the diaphragm removed, shows washer pole 7 with its hole, or pole surface 7', armature ring 13, armature spider 12 with drive screw 11, armature guide springs 8 and 18 with their cushions 9 and extending from the unit is a cord with field leads 3' and armature coil leads 14'.

Fig. 3 which is a rear end view of the armature assembly shows armature ring 15 with notches 20 into which are soldered the ends 12'' of spider 12. It also shows how guide springs 4 and 19 are soldered to ends 12'' of spider arms.

Fig. 4 is a side view of the armature assembly and shows the position of armature rings 13 and 15 and guide springs 4 and 8. Notches in the sides of spider arm 12' give the correct spacing of armature rings 13 and 15.

Fig. 5 which is a side view of core 2, before riveting to cup, shows how poles 16 and 17 are shaped and also how the front end of the core is slotted with narrow slots 21 to separate core into thin sectors 22 to cut down the eddy current loss of the alternating armature flux.

Fig. 6 is a front end view of core 2 showing more fully the spacing of slots 21 in the end of the core.

The operation of the driving motor, Fig. 1, is as follows:

A direct current, from such a source as the plate current supply of a radio set, passes thru field coil 3 magnetizing front end of core 2 N and edge of cup 1 with washer poles 5 and 7 S as shown, causing a flux to flow in air gaps between core poles 16 and 17 and washer poles 5' and 7' respectively. This field flux in air gap 5'—16 tends to pull armature ring 15 to the right and it would pull until the ring would be central in the gap but this pull is counteracted by an equal and opposite pull of the flux in air gap 7'—17 tending to pull armature ring 13 to the left; hence there is no motion of the armature system. Let a signal current though, from a radio set or the like, flow thru armature coil 14 in such a direction as to magnetize core pole 16 N in respect to core pole 17 and this will strengthen the flux in air gap 5'—16 by adding the armature flux to the field flux already there, and will pull armature ring 15 still harder toward the right. At the same time the armature flux will subtract from the field flux in air gap 7'—17 relieving some of the pull on armature ring 13 toward the left. Hence since the pull to the right is strengthened and the pull to the left is weakened the armature system and diaphragm 10 will be moved to the right until the forces again balance, and half of a sound wave cycle will be produced by diaphragm 10. When the other half of the signal current cycle passes thru armature coil 14, the diaphragm will be moved similarly to the left forming the other half of the sound wave cycle. It is self evident that the same armature movement would take place, but in the reverse direction, if the spacing of the armature rings 13 and 15 was less than spacer 6 by the thickness of washer 5 or 7 instead of greater. The maximum armature movement possible is equal to the thickness of an armature ring, as 13, or washer pole, as 7, and is more than is necessary for most musical reproduction. The armature guide springs, as 4 and 8, are very weak as compared to the magnetic forces acting on the armature rings and hence do not hamper the movement of the armature system in accordance with the signal currents.

The clearance between the armature rings and core poles and aramature rings and washer poles is so small and the gap area so large that there is very little air gap reluctance in the field core circuit, which makes the field very efficient as to the number of ampere turns magnetizing force required. This same small air gap reluctance and the large cross section of the paramagnetic metal of the armature flux path gives the motor a very high A. C. efficiency and very high no load impedance. The metal path of the armature flux circuit is partially laminated, where large in cross section, by slotting the end of core 2, as shown at 21 in Figs. 5 and 6, cuttting down the eddy current loss and making possible the reproduction of high sound frequencies. The armature rings 13 and 15 and washers 5 and 7 which are also in the armature flux circuit are so thin that there is very little eddy current loss, and the armature flux density in spacer ring 6 is so low that the eddy current loss is small, so these parts do not usually require lamination. They may be laminated or slotted nevertheless to cut down eddy current losses if it is desired to reproduce extremely high frequencies, at which frequencies the eddy current losses are always larger than at normal frequencies.

Many slight alterations may be made in the motor construction shown without taking it out of the scope of my improvements. For instance the electro field magnet may be replaced by permanent magnets of various shapes; the pole faces and the armature rings may be other shapes than round; the paramagnetic material of the armature, shown as armature rings, need not form complete circuits of 360 degrees around the core; other methods than shown may be employed to guide the armature, as for instance: three or more guide springs or stretched cords or wires may replace the two guide springs on each end of the armature system, or the springs could be replaced by a flexible leather washer or the like fastened to each end of the armature spider and extending to the edge of the cup; and the armature coil may be wound in a large groove between the core poles, which would bring this coil inside of the armature spider instead of outside as shown.

Having thus described my invention, what I claim as new and wish to protect by Letters Patent is:

1. A loud speaker motor comprising a cup shaped member and a center pole inside the cup, both of which are of paramagnetic material; two spaced washer like poles of paramagnetic material magnetically connected at their outer edges and fastened to the rim of the cup with the holes in the washers of larger diameter than the end of the center pole and concentric with same, forming air gaps between the washers and the side surfaces of the center pole; a field coil about the center pole at the bottom of the cup and an armature coil around the outer end of the center pole between the spaced washers; two armature rings of paramagnetic material, one in each air gap between the holes in the washers and the sides of the center pole, a non-magnetic armature spider to which said rings are fastened in spaced relation slightly different from that of the spaced washers; an armature guiding means allowing the armature to move in the direction of the axis of the holes in the washers, a sound producing diaphragm, and a connection from the armature to the sound producing diaphragm to trasmit the movements of the armature to said diaphragm.

2. A loud speaker motor comprising a cup shaped member and a laminated center pole inside the cup, both of which are of paramagnetic material; ridges on the sides of the center pole; two spaced slotted washer like poles of paramagnetic material magnetically connected at their outer edges and fastened to the rim of the cup with the holes in the washers of larger diameter than that of the ridges of the center pole and concentric with same, forming air gaps between the washers and ridges on the side surfaces of the center pole; a field coil about the center pole at the bottom of the cup and an armature coil around the outer end of the center pole between the spaced washers; two armature rings, of paramagnetic material nearly the thickness of the washers, one in each air gap between the washers and the ridges on the sides of the center pole, a non-magnetic armature spider to which said rings are fastened in spaced relation slightly different from that of the spaced washers; an armature guiding means attached to each end of the armature allowing same to move in the direction of the axis of the holes in the washers without rubbing against the washers, armature coil or center pole; a sound producing diaphragm, and a connection from the armature to the sound producing diaphragm.

3. In a loud speaker motor, two flat parallel spaced annular poles with their outside edges magnetically connected together and their pole surfaces facing inwardly, a round core extending through the spaced annular poles so as to form air gaps between the surface of the core and pole surfaces of the annular poles; an armature coil encircling that portion of core lying between the two annular poles, two armature rings of paramagnetic material, one in each air gap between the annular poles and the core, an essentially non-magnetic armature holder to hold the armature rings in spaced relation slightly different from that of the spaced annular poles, an armature guiding means allowing the armature rings to move in the direction of the axis of the core without rubbing against the annular poles, core or armature coil; a sound producing diaphragm, a connection from the armature rings to the sound producing diaphragm to transmit the movements of the armature rings to said diaphragm, and a field system arranged to magnetize the core with one polarity and the annular poles with the opposite polarity of steady magnetism.

4. In a loud speaker, an armature magnetic path consisting of a section of core with poles at each end, said core poles facing outwardly at right angles to the length of the core, other poles facing inwardly toward the core poles and forming air gaps with same, their outer ends being magnetically connected together, armature sections of nearly the same thickness as the thin poles and of slightly less width than the air gaps, one in each of the air gaps, an essentially non-magnetic armature holder to hold the armature sections in spaced relation slightly different from that of the thin poles in the direction of the length of the core, and an armature guiding means permitting the armature sections to move freely together in the air gaps in the direction of the length of the core without touching the pole surfaces; an armature coil encircling the portion of the core between the poles, a field system magnetizing the core and core poles with one polarity of steady magnetism and the outside thin poles with the opposite polarity of magnetism, and a sound producing diaphragm connected so as to receive the vibrations of the armature sections.

5. In a loud speaker, a field magnetic structure composed of a cup shaped member, a center pole attached to the bottom of said cup and extending outwardly, two spaced annular poles attached to the rim of the cup with their annular holes forming circular air gaps with the sides of the center pole, an armature magnetic structure composed of two armature rings, one partially in each air gap between the annular poles and the core; a non-magnetic armature holder to hold the armature rings in spaced relation slightly different from that of the spaced annular poles, an armature guiding means to allow the armature rings and holder to move in and out in the direction of the axis of the center pole without touching the pole surfaces, a sound-producing diaphragm, a connection to transmit the motion of the armature rings and holder to the diaphragm, a field coil around the portion of the center pole in the bottom of the cup, which when excited with a unidirectional current of electricity establishes a field flux in both of the air gaps between the annular poles and the sides of the center pole, the center pole being of one polarity of magnetism and the two annular poles being of the opposite polarity, an armature coil around that portion of the center pole lying between the two annular poles, which when excited with one half of an alternating current cycle increases the flux in the air gap between one annular pole and the center pole while decreasing the flux in the air gap between the other annular pole and the center pole, causing the armature ring partially in the air gap where the flux is being increased to be drawn further into this air gap, while letting the armature ring which is partially in the air gap where the flux is being decreased to move further out of this air gap, the movement of both rings being of the same amount and direction and transmitted by means of the armature holder and connection to the sound producing diaphragm, the opposite half of the alternating current cycle causing the strengthening and weakening of the flux in the opposite air gaps and the converse motion of the armature rings and diaphragm.

6. In a loud speaker motor, the combination of a pair of spaced annular outer poles, and spaced annular inner poles, said poles arranged to form two annular air gaps between them, said poles being magnetized so that the outer poles are of one polarity and the inner poles of the other polarity, an armature comprising two rings of paramagnetic material non-magnetically held in interspaced relation, different from the spacing of the air gaps, a mounting device for holding the armature in position with the rings partially in the air gaps and so to move axially of the air gaps but not otherwise, and a coil mounted around the space between the spaced poles, said coil arranged to carry the fluctuating current for energizing the armature.

CHARLES W. PETERSON.